United States Patent
Shah et al.

(10) Patent No.: US 10,178,741 B1
(45) Date of Patent: Jan. 8, 2019

(54) PROACTIVE IMAGE OBFUSCATION

(71) Applicant: International Business Machines Corporation, Armonk, NY (US)

(72) Inventors: Syed Yousaf Shah, Yorktown Heights, NY (US); Valentina Salapura, Chappaqua, NY (US); Ruchi Mahindru, Elmsford, NY (US); Amos Cahan, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/787,887

(22) Filed: Oct. 19, 2017

(51) Int. Cl.
| | | |
|---|---|---|
| *F21V 33/00* | (2006.01) | |
| *F21V 14/00* | (2018.01) | |
| *F21L 4/00* | (2006.01) | |
| *H05B 37/02* | (2006.01) | |
| *H04L 29/08* | (2006.01) | |

(52) U.S. Cl.
CPC ............ *H05B 37/0227* (2013.01); *F21L 4/00* (2013.01); *F21V 14/006* (2013.01); *F21V 33/0008* (2013.01); *F21V 33/0076* (2013.01); *H04L 67/306* (2013.01)

(58) Field of Classification Search
CPC ............ F21W 2131/304; G06F 1/163; G06F 21/6245; F21V 33/0076; F21V 14/006; F21V 3/0008; F21L 4/00; H05B 37/0227; H04L 67/306
See application file for complete search history.

(56) References Cited

U.S. PATENT DOCUMENTS

| | | | | |
|---|---|---|---|---|
| 8,077,209 B2* | 12/2011 | Kamatani | .......... | H04N 5/23203 348/161 |
| 9,140,444 B2* | 9/2015 | Connor | ............... | F21V 33/0076 |
| 2006/0159440 A1* | 7/2006 | Purkayastha | ............ | G02B 7/28 396/89 |
| 2008/0283735 A1* | 11/2008 | Verenkoff | ................ | A42B 1/24 250/221 |

(Continued)

OTHER PUBLICATIONS

Sunflexzone, "Products", https://www.sunflexzone.com/collections/all, Printed on Oct. 18, 2017, 4 pages (Continued)

*Primary Examiner* — Vibol Tan
(74) *Attorney, Agent, or Firm* — Scully, Scott, Murphy & Presser, P.C.; Robert C. Bunker

(57) ABSTRACT

A control unit is coupled to an infrared light source including at least an infrared light emitter. The infrared light source may be embedded in a wearable device. The control unit captures user preference and also receives current context associated with the wearable device and/or a user wearing the wearable device. The control unit determines automatically based on the current context meeting the user preference, whether to activate the infrared light source to emit infrared light or deactivate the infrared light source to stop emitting infrared light. Responsive to determining that the infrared light source is to be activated, the infrared light source is activated to emit the infrared light. Responsive to determining that the infrared light source is to be deactivated, the infrared light source is deactivated to stop emitting the infrared light.

17 Claims, 7 Drawing Sheets

(56) References Cited

U.S. PATENT DOCUMENTS

| | | | | |
|---|---|---|---|---|
| 2009/0080181 A1* | 3/2009 | Gallagher | ............. | G03B 17/00 362/103 |
| 2010/0149782 A1* | 6/2010 | Smith, Jr. | ............. | G03B 15/02 362/3 |
| 2012/0056546 A1* | 3/2012 | Harvey | ............. | H05B 37/0227 315/159 |

OTHER PUBLICATIONS

Sorrel, C., "CCTV Busting Infra-red Headset Makes You Invisible", http://www.wired.com/2008/02/cctv-busting-in/, Feb. 21, 2008, Printed on Oct. 18, 2017, 6 pages.

URA / FILOART, "IR ASC—Infrared Light Against Surveillance Cameras", http://translate.google.com/translate?u=http%3A%2F%2Fwww.oberwelt.de%2Fprojects%2F2008%2FFilo%2520art.htm&langpair=de|en&hl=en&ie=UTF8, Printed on Oct. 18, 2017, 1 page.

Wikipedia, "Remote control", https://en.wikipedia.org/wiki/Remote_control, Last edit Oct. 16, 2017, Printed on Oct. 18, 2017, 8 pages.

Lotus Gemology, http://www.lotusgemology.com/images/library/articles/gemologyarticles/ftir-intrigue/in frared-spectrum.jpg, Printed on Oct. 18, 2017, 1 page.

Parekh, A., "IR LEDs used to defeat Security Cameras", http://hackedgadgets.com/2008/02/21/ir-leds-used-to-defeat-security-cameras/, Feb. 21, 2008, Printed on Oct. 18, 2017, 4 pages.

Zolfagharifard, E., "Word on the TWEET: 'Shazam for birds' app lets you identify birdsong in real-time", http://www.dailymail.co.uk/sciencetech/article-2812292/Word-TWEET-Shazam-birds-app-lets-identify-birdsong-real-time.html, Oct. 29, 2014, Printed on Oct. 18, 2017, 27 pages.

"Infrared photos and night vision", http://danyk.cz/irfot_en.html, Printed on Oct. 19, 2017, 10 pages.

* cited by examiner

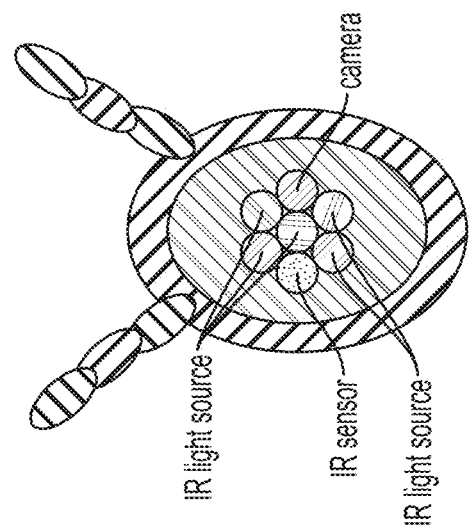
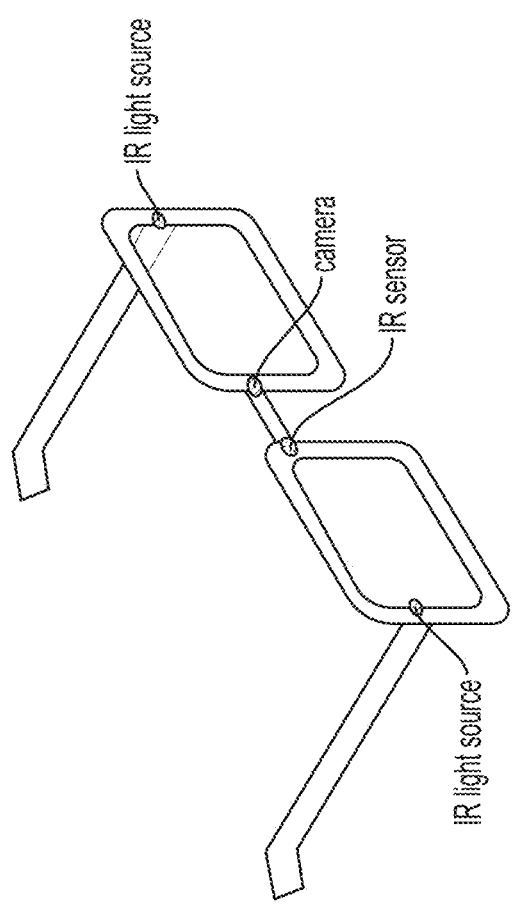
FIG. 2B
FIG. 2A

PROACTIVE IMAGE OBFUSCATION

FIELD

The present application relates generally to computers and computer applications, and more particularly to a device that masks images.

BACKGROUND

With the widespread use of digital camera equipped smart phones, it is difficult for individuals to avoid being photographed and having their photos distributed or uploaded on social media even when not desired. Privacy protection may be needed in case the user or individual is not in a mood or state to be in a picture, in cases of safety reasons and/or other reasons. For instance, parents and guardians may want to protect their children from being photographed and having the child's contextual information like street and school playground given away or shown. Therefore, there is a need for a system or device that can blur or mask an image, for example, when captured by a smart phone and other cameras.

BRIEF SUMMARY

A privacy protection system and method may be provided. The privacy protection system, in one aspect, may include an infrared light source comprising at least an infrared light emitter. The infrared light source may be embedded in a wearable device. A hardware processor may be coupled to the infrared light source. A memory device may be coupled with the hardware processor and store current context associated with the wearable device. The hardware processor may be operable to capture user privacy preference, and further operable to retrieve the current context from the memory device. The hardware processor may be further operable to determine automatically based on the current context meeting the user privacy preference, whether to activate the infrared light source to emit infrared light or deactivate the infrared light source to stop emitting infrared light. Responsive to the hardware processor determining that the infrared light source is to be activated, the hardware processor may be operable to control the infrared light source to emit the infrared light. Responsive to the hardware processor determining that the infrared light source is to be deactivated, the hardware processor may be operable to control the infrared light source to stop emitting the infrared light.

A method of protecting privacy, in one aspect, may be executed by a hardware processor coupled to an infrared light source comprising at least an infrared light emitter, the infrared light source embedded in a wearable device. The method, in one aspect, may include capturing user privacy preference. The method may also include receiving current context from a memory device. The method may further include determining automatically based on the current context meeting the user privacy preference, whether to activate the infrared light source to emit infrared light or deactivate the infrared light source to stop emitting infrared light. The method may also include, responsive to determining that the infrared light source is to be activated, controlling the infrared light source to emit the infrared light. The method may also include, responsive to determining that the infrared light source is to be deactivated, controlling the infrared light source to stop emitting the infrared light.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIGS. 2A and 2B illustrate examples of wearable devices on which a privacy protection device may be embedded in one embodiment.

DETAILED DESCRIPTION

Figure 1:
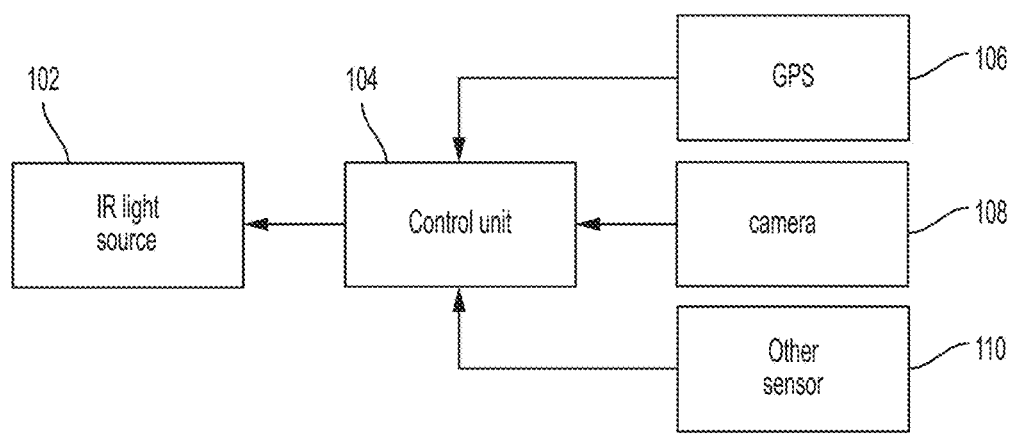
FIG. 1 is a schematic illustration of a photo-blurring device in one embodiment.

A device in one embodiment is a wearable Infrared (IR) light source and may be embedded in various accessories like but not limited to glasses, hearing aids, earrings and other jewelry, shirt button, pen, phone, and/or other items. The device in one embodiment allows a user or individual being photographed to be able to control whether the user would like the photograph taken to be masked or not by activating or deactivating the device. The user may wear the device, which for example, may be embedded in face masking glasses. In one embodiment, the wearable IR device may be pre-configured, for example, by the user, with settings that will cause the IR device to trigger automatically in the user defined settings (e.g., location, time, additional sensors). The IR device that provides IR light source in the present disclosure is also referred to as a proactive privacy protection device. The device can be user activated or automatically or autonomously activated based on pre-programmed user preferences, for example, in defined locations (e.g., public places, sightseeing areas), and/or based on current context meeting pre-programmed settings, conditions and/or thresholds. The device in one embodiment may be triggered or activated automatically by sensing camera flash or another light sensor, for instance, so as to mask an image being captured by the camera or like device associated with the sensed camera flash or light sensor. In one embodiment, the device may be deactivated automatically by sensing an external IR signal, for example, by taking periodic scan for external IR signal. Smart phones and regular cameras do not usually have IR filters, which allows for saturating their optic sensors using IR light. The device and the workings of the device need not compromise the function of security cameras, which are equipped with IR filters.

Infrared (IR) light are used in consumer electronics such as TV remote controls. Light emitting diodes (LEDs) producing wavelengths of 940 nanometers (nm) are used with roughly 80 milliamps (mA) of current. IR light is not considered harmful to humans; for example, it is used for therapies, thermometers, baby monitors and night-vision cameras.

A device in one embodiment may use IR wavelength to obstruct smartphone cameras. For example, IR wavelength may be approximately 1000 nm, or other wavelength as recommended by a subject matter expert such as an electronics engineer or determined by experimentation. There are different ways in which the IR light source or camera jamming device can be activated. In one embodiment, the camera jamming device can be turned on and off by the user as desired. In another embodiment, the camera jamming device is self-activated based on defined settings, for example, user preferences. An example of a defined setting or user preference may include a user's location. The user location may be determined, for example, by communicating with a Global Positioning System (GPS) device, using WiFi connection and/or peering the device with user's smart devices equipped with GPS device. Knowing user location, and having user preferences, the device can activate or deactivate itself. For example, one or more locations may be marked by the user as locations which activate the privacy protection device. The device may classify such locations as locations with high probability of getting photographed with a need to protect privacy. An example of such a location is highly visited tourist attraction. Another example may be a venue of major sport events, such as a sport stadium.

In another embodiment, the privacy protection preference can be based on timestamp, e.g., time of a day, and day in a month. For example, evening hours may trigger or activate privacy protection in the device. In another example, evening hours versus morning hours at the same location may trigger or activate privacy protection in the device. In another embodiment, user's calendar information may be accessed and used to trigger privacy protection in the device. A combination of the above approaches can also act as a trigger for the device. Another example of triggering of the privacy protection in the device may include detection of a specific person with a camera mounted smart device in the geoproximity of the user, for example, within a configurable threshold distance of the user. The presence of another user with a smart device with a camera can be detected using methods such as feed analysis used in a social network application, and responsive to detecting another user with a smart device with a camera, privacy protection feature in the device may be activated.

In yet another embodiment, the activation of privacy protection may be caused by a cognitive factor or condition such as the user's mood or user's cognitive state. For example, responsive to detecting that the user is feeling sad or drowsy, the privacy protection device is automatically activated. In one embodiment, such state of the user may be detected based on vital signs such as heart rate of the user available through a wearable sensor, smart watch, or another health related mobile application that may be integrated with a user's phone or user's wearable device, and that continuously or continually measure the user's vital signs. In another embodiment, the device may sense that the user is not ready for the picture, for instance, the user's eye may be blinking (e.g., detected by a sensor) and hence, the device may activate the IR light source. A movement by the user, for example, detected from a user's smart device such as a smart phone or smart watch or another wearable device that incorporates, for example, a gyro sensor, may signal that a user is not ready for picture taking.

The privacy protection device can be fixed or transferable from one object to another. For example, it can be attached to necklace at one time and earring at another time. The privacy protection device can work in collaboration with a user's smart phone or smart device that incorporates a GPS device and logic to determine if the user is in a place where privacy is to be protected. In another aspect, computation may be performed on a smart phone to generate a trigger for the privacy protection device. In another aspect, the privacy protection device may self-contain all modules needed for the computation and determination of user location such as a control unit or processing unit, a GPS device and other sensors.

To prevent the misuse, this device may also be coupled with an additional sensor which is capable of detecting that the camera is non-smart phone, for example, security cameras such as used for ATM, banks, streets, airports, landmarks have IR spectrum. In one embodiment, the device may be peered with a user's smart device, e.g., smart phone or smart watch and via an application the current GPS location of the user may be detected. The device may then cross check the current location of the user with nearby landmarks, check the current location across a database of popular landmark locations, and/or check with a search engine as to whether there is any landmark or popular place within x distance (e.g., miles) of the current location. For example, if the user's current location is within 0.5 miles of a popular landmark found by a search engine, then the device is sent a signal to turn off or deactivate the light source. In another aspect, the device can sense that the user of the device is in a surveillance area. For instance, the user location can be checked to determine whether it is at places like banks, airports or other location which are generally under surveillance. For example, a database, a service or data source can be searched or looked up for determining whether the current location or nearby location is under surveillance.

FIG. 1 is a schematic illustration of a photo-blurring device in one embodiment. An infrared (IR) light source 102 invisible to the human eye can project light in a continuous, on user demand or automatically triggered fashion. For instance, the IR or the light that is emitting is invisible to human eye. Optional sensors such as an infrared light sensor may be used to detect cameras aimed at the user, a camera 108 for optic image recognition of cameras or smart phones directed at the user, and other sensors 110 (e.g., an electric or optic blinking sensor) are functionally connected or coupled to a control unit 104 that is capable of performing computations and activating the infrared light source 102. Some surveillance cameras emit infrared light to be able to see in the dark. Such light may be detectable by infrared detection sensors. The device of the present disclosure in one embodiment detects such an infrared source which is external to the device. For example, the device may detect that the user is being surveilled in the dark and a surveillance camera is using infrared light. As another example, the device may detect an infrared light that is emitted from another camera device. Still as another example, the camera 108 may take visual images of items in its field view and communicate the visual images to the control unit, which may perform an image recognition technique to determine whether the visual images contain an image of a camera or smartphone directed at the user wearing the device. The control unit 104 may be a processor or a module executing on a hardware processor and coupled to the IR light source 102. In one embodiment, the control unit 104 receives or senses the IR light source, along with user preferences to determine whether the IR light source in 102 should be activated or deactivated. For example, if the user preference is to activate the IR light sources 102 in certain locations based on GPS data from GSP device 106, then the control unit 104 enables the light source 102. Another example is activation based on the user's calendar. Another example may be activation of the IR light source 102 based on GPS location and user's calendar. Similarly, the user's preference, GPS, user's calendar and other sensors may be used to activate or deactivate the IR light source in 102. GPS 106 may be a GPS receiver or GPS-enabled device that can determine or receive the current location data. The control unit 104 may activate or deactivate the IR light source 102 based on the current location data detected via the GPS 106.

FIGS. 2A and 2B illustrate examples of wearable devices on which a privacy protection device may be embedded in one embodiment. FIG. 2A shows a device embedded in glasses frame in one embodiment. For instance, a glasses frame may incorporate an IR light source, camera and IR sensor modules and a control unit. FIG. 2B shows a device embedded in a necklace in one embodiment. For instance, a necklace may incorporate IR light source, camera and IR sensor modules and a control unit. In one embodiment, a control unit that performs computation, determines whether an IR light source should be turned on or off based on its computation, communicates with sensors may be embedded in the device. In another embodiment, the control unit may be a separate processor that communicates with the sensors on the wearable device wirelessly.

Figure 3:
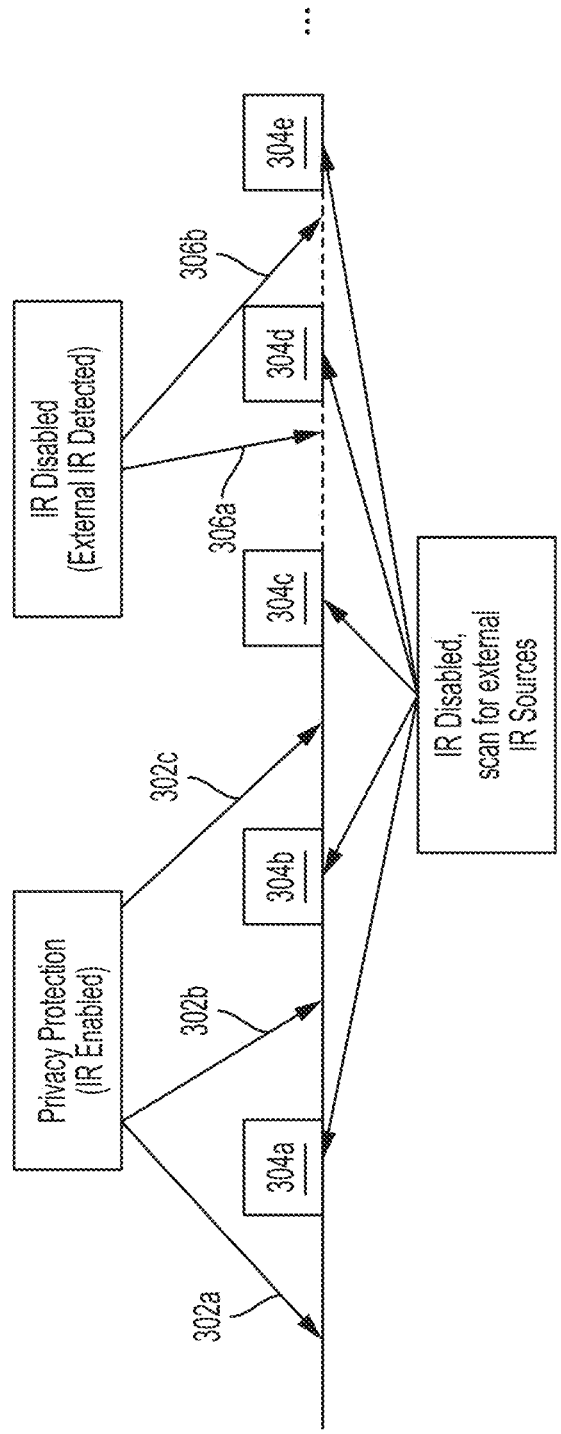
FIG. 3 is a diagram showing periodic scanning and/or detecting of external IR signal in one embodiment.

FIG. 3 is a diagram showing periodic scanning and/or detecting of external IR signal in one embodiment. The figure shows how the device uses input from IR detector to detect the presence of an external IR source such as surveillance camera. To detect external IR device, the system disables its own IR source, and periodically scans for any external IR signals. For instance, the control unit 104 shown in FIG. 1 may scan for any external IR signals, for example, using a camera 108 for such detection. An infrared sensor may also detect infrared light. If the external IR signals are detected the proactive privacy protection device disables its own IR source autonomously (e.g., self-disables) until there is no external IR signal present. The horizontal line represents time in the figure. The device in one embodiment has its IR light emitting capability turned on (e.g., as shown at 302a, 302b, 302c). Periodically, for example, every defined interval of time (e.g., shown at 304a, 304b, 304c, 304d, 304e), the device self-disables its IR light emitting capability and scans for external IR sources outside of the device. Responsive to detecting that there are external IR sources, for example, directed at the device, the device automatically self-disables its IR light emitting capability (e.g., shown at 306a, 306b), until for example, the device detects no external IR sources based on its periodic scanning. For instance, if no external sources are detected (e.g., the device goes out of range of the detected external IR source or the external IR source is turned off), the device self-enables its IR light source capability.

In another aspect, the device may be dynamically disabled when potential images could be used as evidence in an event of emergency or mishap. Such disablement of the device can be triggered based on the location (which is considered high risk, e.g., landmark, tourist attraction) and/or important events such as national holiday, celebration, games and/or during elevated threat/alert level periods. Such trigger may also be broadcasted to all the devices based on government policy (e.g., threat level alerts issued by a government agency). For instance, the device of the present disclosure may detect a national security level and, for example, if it is elevated to a threshold high level or high security alert in the area where the user is currently present, and such security alert is published by government agencies via a broadcast or, for example, published on a website or via another service, the device honors the alert and disables itself so that the user can be photographed. In another aspect, the trigger may be activated responsive to a local security agency or another local government agency's alert, for example, based on an occurrence of a local incident. In another aspect, the device may be coupled with an additional sensor which detects abnormal noise indicating a security threat, e.g., screaming or shouting sound, emergency sirens, and/or other sound, to dynamically disable itself (e.g., autonomously or in a self-disabling manner). For example, a trigger or signal from an app (application) running on a smart phone that detects unusually loud sound may be received by the device. The device may also receive from a custom made audio sensor or acoustic sensor that can detect pattern of sounds, e.g., emergency siren. As an example, such detection can be achieved by audio classification of sounds that a microphone detects or the audio sensor detects. For instance, a smartphone may include built-in deep learning networks that can perform detection very fast.

A system in one embodiment may protect user privacy and may include a wearable device with IR light source and a control module that activates the IR light source to emit IR light. In one aspect, the control module may be embedded in the wearable device. In another aspect, the control module may be a separate processor or processing device that communicates with the wearable device's IR light source, for example, wirelessly to activate and deactivate the IR light source. The control module, for instance, captures user privacy preferences, for instance, by retrieving pre-defined or pre-set data stored in a storage or memory device, and determines whether user privacy needs to be protected based on the captured user privacy preferences and/or other information. The control module sends a signal to the IR light source to activate and deactivate the IR light source. Automatically activating and deactivating of IR light source is based on user preferences in one aspect. In another aspect, automatically activating and deactivating of IR light source may be based on the presence of an external IR signal, security threats and/or other conditions. The control module may be configured to activate and/or deactivate the IR light source based on any one of the user preferences, the presence of an external IR signal, security threats and/or other conditions.

In one aspect, the control module is able to determine the current user location and based on the current user location, determine whether to activate or deactivate the IR light source. In another aspect, the control module may determine privacy protection needs based on the determined user location. In another aspect, the control module may determine privacy protection needs based on the time of a day and/or calendar schedule, and based on the privacy protection needs, activate and/or deactivate the IR light source of the device.

In one aspect, the user preference may be defined based on geo proximity of another device which can take pictures such as a camera or a camera-enabled device. In another aspect, the user preference may be based on proximity of a person whose profile triggers privacy protection. Profile may have privacy defined based on other users who the user does not want to be in a picture with, e.g. other user's image may be added to the blocked list. Yet in another aspect, user preference may be defined based on user's mood or cognitive state. User preferences may be defined based on any combination of the above factors, and based on the user preferences, the control module may activate or deactivate the IR light source on the device.

Referring back to FIG. 1, the system shown provides privacy protection in one embodiment. The IR light source 102 may include an IR emitter or bulb and power supply input and may be embedded in or on, built in or on, or carried on a wearable device (e.g., as shown in FIGS. 2A and 2B as examples). The control unit or hardware processor 104 is coupled to the infrared light source. A memory device coupled to the hardware processor may store the current context associated with the wearable device. The hardware processor 104 captures user privacy preference, and also retrieves the current context from the memory device. Based on the current context meeting the user privacy preference, the hardware processor 104 determines automatically whether to activate the infrared light source 102 to emit infrared light or deactivate the infrared light source 102 to stop emitting infrared light. Responsive to the hardware processor determining that the infrared light source 102 is to be activated, the hardware processor 104 controls the infrared light source 102 to emit the infrared light. Responsive to the hardware processor 104 determining that the infrared light source 102 is to be deactivated, the hardware processor 104 controls the infrared light source 102 to stop emitting the infrared light.

The hardware processor 104 deactivates the infrared light source device periodically, and during the period the infrared light source is deactivated, the hardware processor 104 scans for the presence of external infrared light within a threshold distance of the wearable device, and responsive to determining that the external infrared light is present within the threshold distance of the wearable device, the hardware processor 104 deactivates the infrared light source 102 so that the infrared light source 102 does not emit infrared light from the wearable device while the external infrared light is present within the threshold distance of the wearable device. The threshold distance is configurable, and may be configured by a user, and stored in the memory device. In one embodiment, the hardware processor 104 captures the user privacy preference by receiving user input specifying the user privacy preference, which may be stored in the memory device.

A global positioning system (GPS) device 106 may be embedded or installed on the wearable device and coupled to the hardware processor 104, and the hardware processor 104 determines the current location of the wearable device based on information received in the GPS device 106. The hardware processor updates the current context based on receiving information from a plurality of sensing devices, for example, GPS device 106, camera 108, and another sensor 110. The current context may include one or more of location, time, geoproximity of the wearable device to another device capable of taking a picture, geoproximity of the wearable device to a specified individual and cognitive state of a user carrying the wearable device. The user privacy preference may be conditioned based on one or more of location, time, geoproximity to another device capable of taking a picture, geoproximity to a specified individual, and cognitive state of a user carrying the wearable device.

Figure 4:
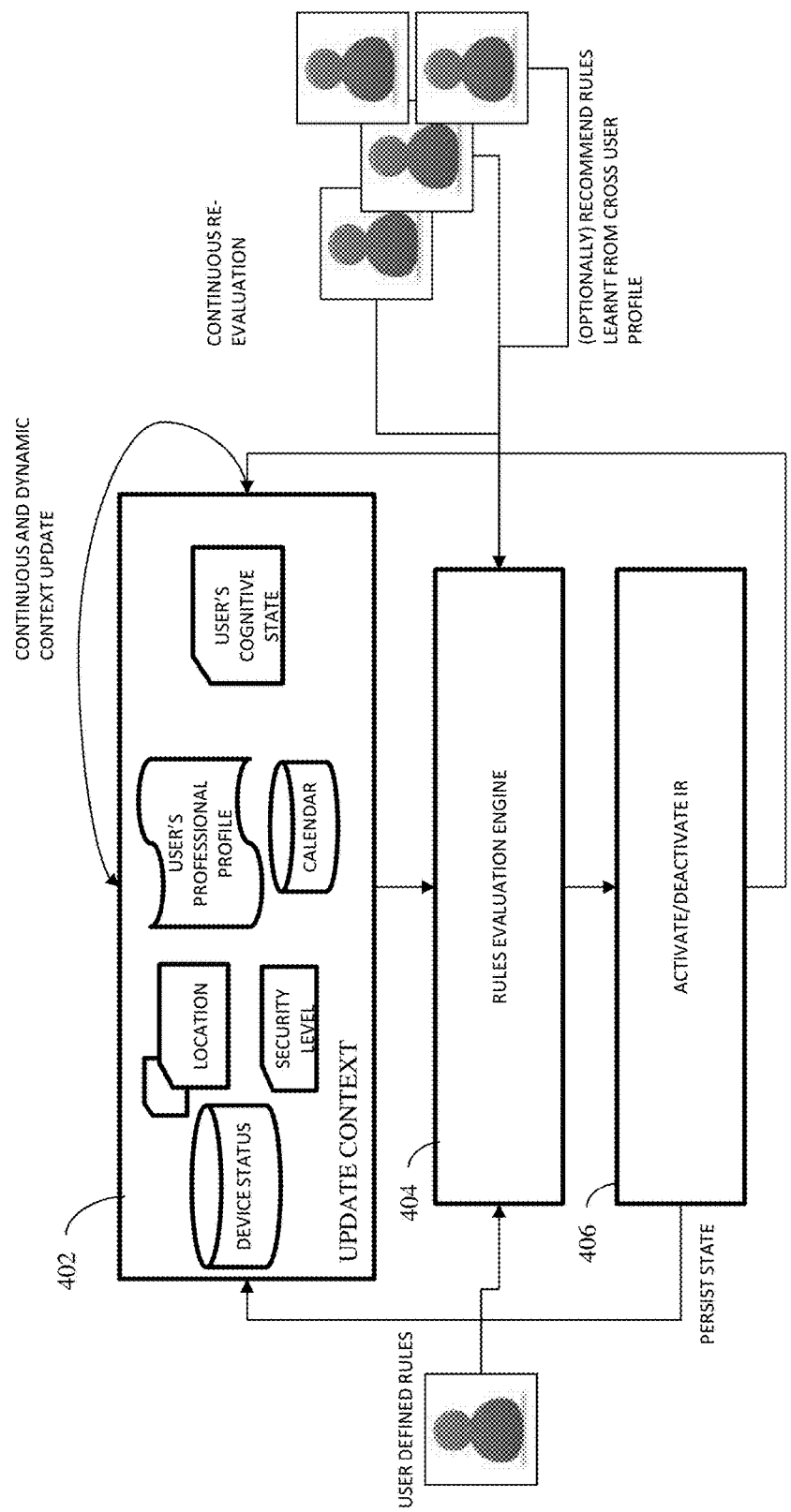
FIG. 4 is a diagram illustrating a control flow of a system in one embodiment.

FIG. 4 is a diagram illustrating a control flow of a system in one embodiment. In one embodiment, the system dynamically and continuously collects data from various data sources such as current location, classification of location, security level associated with location, user's calendar, time of day, security level, audience identified from the calendar, user's professional profile, user's cognitive state/mood, presence of another IR device/sensors, security sensors, and updates contextual information of a user in a profile.

For example, a control module may continuously and dynamically update context as shown at 402 with current information. Such current information may include location information. For instance, the control unit or module may communicate with a GPS device to determine the user's or the device's (worn by the user) current location. The control module may be a processing logic executing on a hardware processor. The control module may also determine classification of location, for example, security building, landmark, or another. The control module may determine the security level associate with the current location, for example, via accessing a social network application, a government agency's web site or server that posts such information, or via another online information source. For instance, there may exist an alert posted on the national security website, news feeds, and/or alerts triggered on a mobile or smart phone.

The control module may also access the user's calendar, for example, and retrieve information such as events or meetings on the calendar. Audience from the calendar may also be identified, for example, other possible participants of the event and/or meeting. In another aspect, the control module may also access user's professional profile, for example, from a database or data source that stores such information. The control module accesses and retrieves the above-specified information, for example, with the permission of the user.

The control module may also determine the time of day, for example, from its processor clock, from a connected or paired device such as a smartphone, smart watch, and/or another device.

The control module may also determine the user's cognitive state or mood. User's cognitive state or mood, for example, may be obtained from the vitals of the user, for instance, measured by the wearable devices, e.g., smart watch, another medical device, and/or an app (mobile application) that can detect a user's cognitive state. For example, an app may be able to detect from a user's movement correlated with vitals to determine the user's current health status.

The control module may also determine the presence of another IR device and/or sensors. For instance, the device can be peered with a user's smart device, for example, a smart phone or smart watch and via an app can detect current GPS location of the user. The device may then cross check the current location of the user with nearby landmarks, check the current location of the user across a database of popular landmark locations, and/or check the current location of the user with a search engine to determine whether there is any landmark or popular place within x distance (e.g., miles) of the current location of the user. For instance, if it is determined that the user's current location is within 0.5 miles of a popular landmark found by a search engine, the device may be sent a signal to deactivate or turn off the light source emission.

The control module updates context based on any one or more of the above obtained information. For instance, a profile associated with the user may be created and store the above described data. The control module may then update the data (current context) in the profile.

The control module may also define and update rules based on user input. For example, a user may input defined rules and any updates. The control module receives user input and stores the user defined rules. The control module may also recommend to the user rules for evaluation based on the current contextual information. The control module may recommend rules based on other user's preferences and/or profile which may match with the user's preferences and/or profile. Thus, for example, along with user defined rules, other rules may be extracted from user's contextual information. The recommended rules may change over time as the contextual information changes. For example, at a given location during a given hour (or particular time), it may be known that there are many visitors. Such information may be publically available, and the controller may utilize the information and recommend to the user to enable the IR device. The device may also determined from a user's profile that the user has blocked an individual, and therefore, the device (controller of the device) may recommend to enable the IR device when the user is in such company. As another example, the user may have marked an event as a private event on the calendar, therefore, the IR device may recommend a rule to enable IR device during that event and at the location of the event. In future, if the user visits such a location, the controller may recommend the user to enable IR. If similar participants are in future meetings, the device may recommend to enable IR. The device in one embodiment learns from a user's behavior and is able to detect whether similar attributes are repeated. When the similar attributes are repeated, the device leverages the attributes to recommend new rules.

Rules engine logic 404 of the control module, for example, as shown at 404 may evaluate rules based on the current context information 402. Based on the current context information meeting one or more of the rules, an IR light source of the device may be activated and deactivated as shown at 406. The current context may be continuously updated as shown at 402, for example, based on the current information detected or received from various sources. The privacy mode of the user may be continuously evaluated based on the context of the user and the privacy preferences of the user. In one aspect, the user privacy determination rules may be modified based on the context and/or on the manual override of the user (rules learning)

Figure 5:
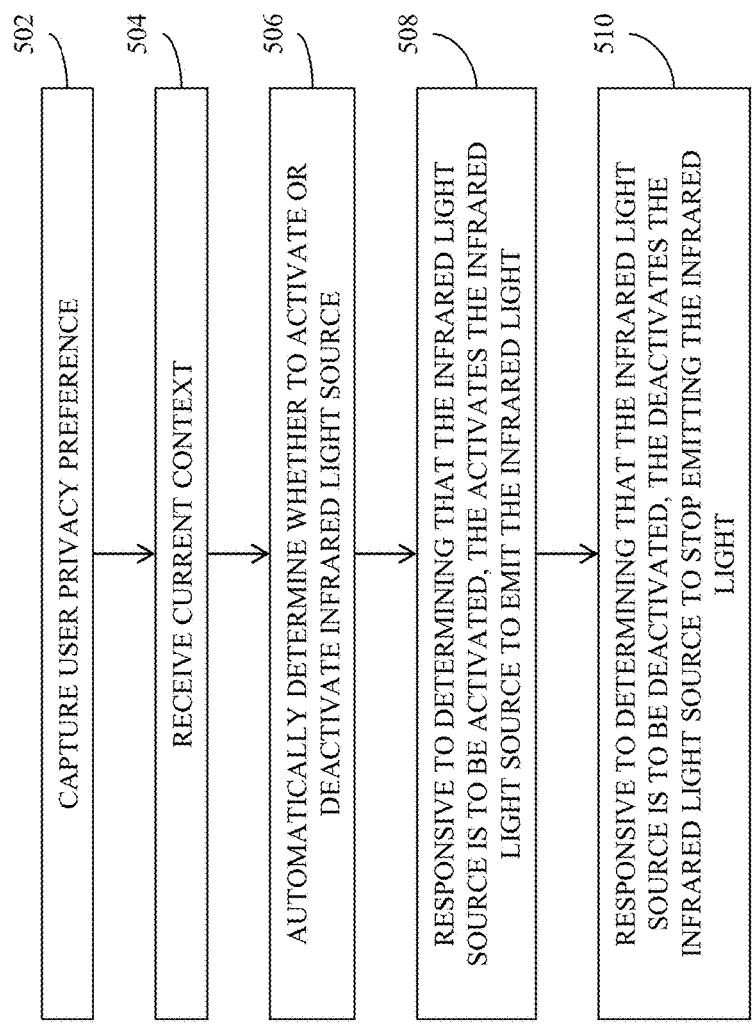
FIG. 5 is a flow diagram illustrating a method in one embodiment of privacy protection device.

FIG. 5 is a flow diagram illustrating a method in one embodiment of privacy protection device. The method may be executed by a hardware processor as described above coupled to an infrared light source that may include at least an infrared light emitter, the infrared light source embedded in a wearable device. In one embodiment, the device allows for privacy that is selective, for example, based on a user preference and/or current context such as location, time and/or what other devices are in geoproximity of the user. The device triggers protecting of privacy by spreading IR light around user's face so that user's identity can be protected by producing bright light around user's face. The bright light protects or blurs the user's face in photo image when the photo is taken. In one aspect, the device allows a user to be proactive in protecting privacy, for instance, by wearing the device and defining a privacy protection preference setting. At 502, user privacy preference is captured. The user privacy preference may be specified by a user.

At 504, the current context (e.g., most currently updated context) may be received or retrieved from a memory device. For example, context information may include location, time, geoproximity of the wearable device to another device capable of taking a picture, geoproximity of the wearable device to a specified individual and/or cognitive state of a user carrying the wearable device, or any combination thereof.

At 506, based on the current context meeting the user privacy preference, the hardware processor automatically determines whether to activate the infrared light source to emit infrared light or deactivate the infrared light source to stop emitting infrared light. For example, the user privacy preference is conditioned based on one or more of location, time, geoproximity to another device capable of taking a picture, geoproximity to a specified individual, and cognitive state of a user carrying the wearable device.

At 508, responsive to determining that the infrared light source is to be activated, the hardware processor controls or activates the infrared light source to emit the infrared light.

At 510, responsive to determining that the infrared light source is to be deactivated, the hardware processor controls or deactivates the infrared light source to stop emitting the infrared light.

The hardware processor, for example, a control unit may detect current context and update the context stored in memory (e.g., as a profile) based on the current detected context. The detecting and updating may be done periodically in a continuous manner. The detecting of the current context may be performed via a plurality of sensor devices, for example, connected to the wearable device. For example, location information may be determined via a GPS device that may be embedded with the wearable device.

The method may also include deactivating the infrared light source device periodically and during the period the infrared light source is deactivated, scanning for a presence of external infrared light with in a threshold distance of the wearable device. Responsive to determining that the external infrared light is present within the threshold distance of the wearable device, the hardware processor or the control unit keeps the infrared light source deactivated so that the infrared light source does not emit infrared light from the wearable device while the external infrared light is present within the threshold distance of the wearable device.

This periodic scanning may be performed in between the periods of performing the functions described at 502 to 510.

Figure 6:
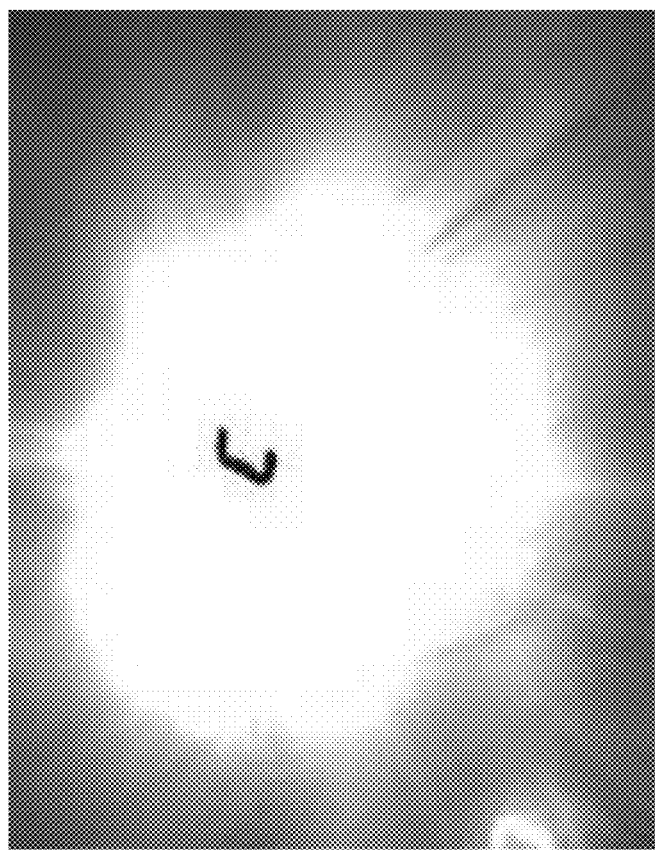
FIG. 6 shows an example IR light emitted from or around an image target for blurring or masking of a photo image of the image target.

FIG. 6 shows an example IR light emitted from or around an image target for blurring or masking of a photo image of the image target. As shown, the bright light 602 that is emitted blurs a camera image.

Figure 7:
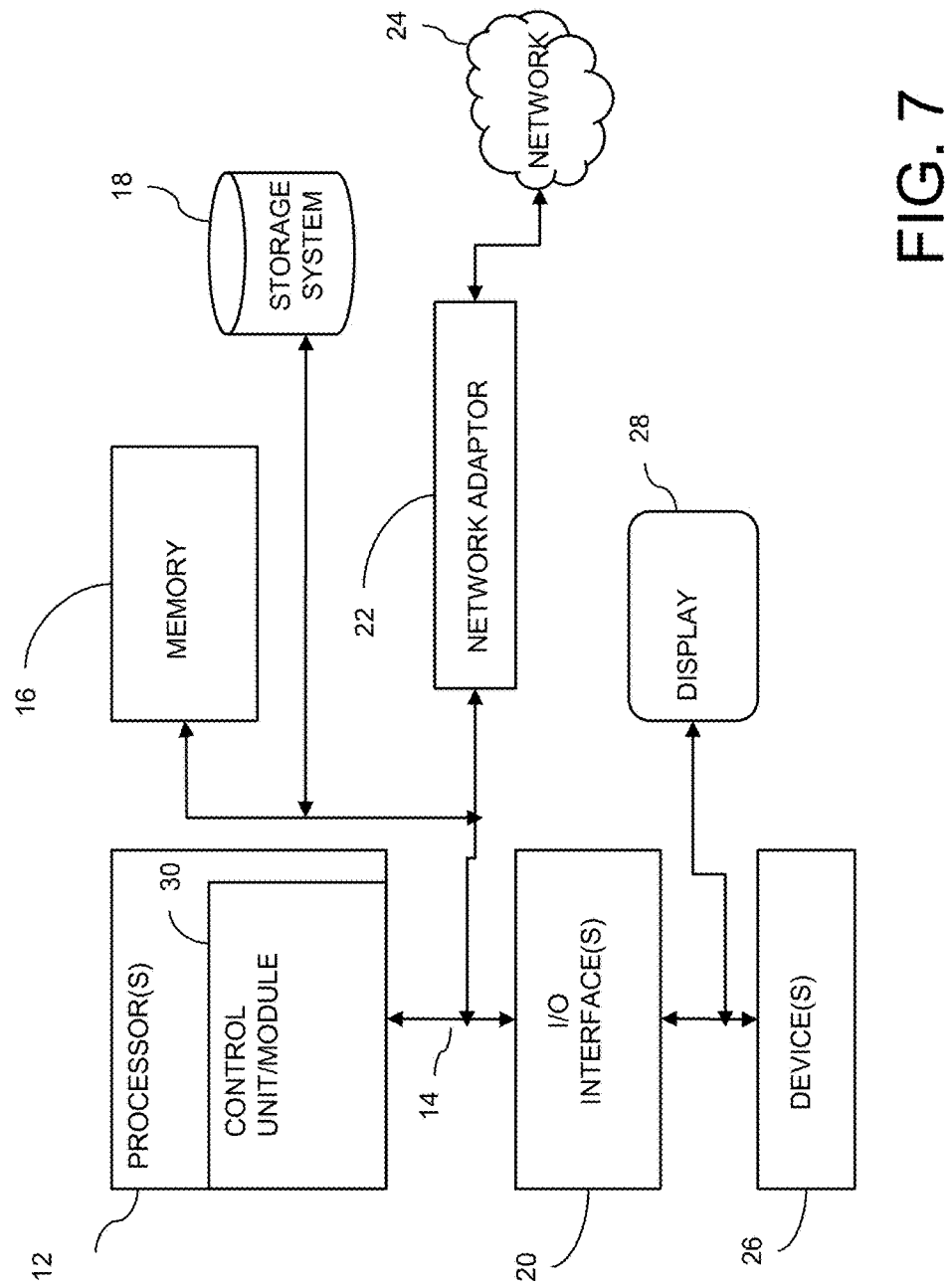
FIG. 7 illustrates a schematic of an example computer or processing system that may implement a photo blurring system in one embodiment of the present disclosure.

FIG. 7 illustrates a schematic of an example computer or processing system that may implement a photo blurring system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a control module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A privacy protection system, comprising:
an infrared light source comprising at least an infrared light emitter, the infrared light source embedded in a wearable device;
a hardware processor coupled to the infrared light source;
a memory device coupled to the hardware processor and storing current context associated with the wearable device;
the hardware processor operable to capture user privacy preference,
the hardware processor further operable to retrieve the current context from the memory device,
the hardware processor further operable to determine automatically based on the current context meeting the user privacy preference, whether to activate the infrared light source to emit infrared light or deactivate the infrared light source to stop emitting infrared light,
responsive to the hardware processor determining that the infrared light source is to be activated, the hardware processor controlling the infrared light source to emit the infrared light,
responsive to the hardware processor determining that the infrared light source is to be deactivated, the hardware processor controlling the infrared light source to stop emitting the infrared light,
the hardware processor further operable to recommend user rules for activation and deactivation based on contextual information learned from historical data from user's profile, wherein the hardware processor deactivates the infrared light source device periodically and during the period the infrared light source is deactivated, scans for a presence of external infrared light with in a threshold distance of the wearable device, and
responsive to determining that the external infrared light is present within the threshold distance of the wearable device, the hardware processor deactivating the infrared light source so that the infrared light source does not emit infrared light from the wearable device while the external infrared light is present within the threshold distance of the wearable device.

2. The system of claim 1, wherein the hardware processor captures the user privacy preference by receiving user input specifying the user privacy preference.

3. The system of claim 1, further comprising a global positioning system (GPS) device embedded on the wearable device and coupled to the hardware processor wherein the hardware processor determines current location of the wearable device based on information received in the GPS device.

4. The system of claim 1, wherein the hardware processor updates the current context based on receiving information from a plurality of sensing devices.

5. The system of claim 1, wherein the current context comprises location, time, geoproximity of the wearable device to another device capable of taking a picture, geoproximity of the wearable device to a specified individual and cognitive state of a user carrying the wearable device.

6. The system of claim 1, wherein the user privacy preference is conditioned based on one or more of location, time, geoproximity to another device capable of taking a picture, geoproximity to a specified individual, and cognitive state of a user carrying the wearable device.

7. A method of protecting privacy, the method executed by a hardware processor coupled to an infrared light source comprising at least an infrared light emitter, the infrared light source embedded in a wearable device, the method comprising:
capturing user privacy preference;
receiving current context from a memory device;
determining automatically based on the current context meeting the user privacy preference, whether to activate the infrared light source to emit infrared light or deactivate the infrared light source to stop emitting infrared light,
responsive to determining that the infrared light source is to be activated, controlling the infrared light source to emit the infrared light;
responsive to determining that the infrared light source is to be deactivated, controlling the infrared light source to stop emitting the infrared light;
recommending user rules for activation and deactivation based on contextual information learned from historical data from user's profile;
deactivating the infrared light source device periodically and during the period the infrared light source is deactivated, scanning for a presence of external infrared light with in a threshold distance of the wearable device; and
responsive to determining that the external infrared light is present within the threshold distance of the wearable device, keeping the infrared light source deactivated so that the infrared light source does not emit infrared light from the wearable device while the external infrared light is present within the threshold distance of the wearable device.

8. The method of claim 7, wherein the capturing the user privacy preference comprises receiving user input specifying the user privacy preference.

9. The method of claim 7, further comprising determining current location of the wearable device based on information received in a GPS device embedded on the wearable device and coupled to the hardware processor.

10. The method of claim 7, further comprising:
receiving information from a plurality of sensing devices; and
updating the current context based on the received information.

11. The method of claim 7, wherein the current context comprises location, time, geoproximity of the wearable device to another device capable of taking a picture, geoproximity of the wearable device to a specified individual and cognitive state of a user carrying the wearable device.

12. The method of claim 7, wherein the user privacy preference is conditioned based on one or more of location, time, geoproximity to another device capable of taking a picture, geoproximity to a specified individual, and cognitive state of a user carrying the wearable device.

13. A non-transitional computer readable storage medium storing a program of instructions executable by a machine to perform a method of protecting privacy, the method comprising:
capturing user privacy preference;
receiving current context from a memory device;
determining automatically based on the current context meeting the user privacy preference, whether to activate an infrared light source embedded in a wearable device to emit infrared light or deactivate the infrared light source to stop emitting infrared light,
responsive to determining that the infrared light source is to be activated, controlling the infrared light source to emit the infrared light;
responsive to determining that the infrared light source is to be deactivated, controlling the infrared light source to stop emitting the infrared light;
recommending user rules for activation and deactivation based on contextual information learned from historical data from user's profile;
deactivating the infrared light source device periodically and during the period the infrared light source is deactivated, scanning for a presence of external infrared light with in a threshold distance of the wearable device; and
responsive to determining that the external infrared light is present within the threshold distance of the wearable device, keeping the infrared light source deactivated so that the infrared light source does not emit infrared light from the wearable device while the external infrared light is present within the threshold distance of the wearable device.

14. The non-transitory computer readable storage medium of claim 13, wherein the capturing the user privacy preference comprises receiving user input specifying the user privacy preference.

15. The non-transitory computer readable storage medium of claim 13, further comprising determining current location of the wearable device based on information received in a GPS device embedded on the wearable device and coupled to the hardware processor.

16. The non-transitory computer readable storage medium of claim 13, further comprising:
receiving information from a plurality of sensing devices; and
updating the current context based on the received information.

17. The non-transitory computer readable storage medium of claim 13, wherein the current context comprises location, time, geoproximity of the wearable device to another device capable of taking a picture, geoproximity of the wearable device to a specified individual and cognitive state of a user carrying the wearable device, and
wherein the user privacy preference is conditioned based on one or more of the location, time, geoproximity to another device capable of taking a picture, geoproximity to a specified individual, and cognitive state of a user carrying the wearable device.

\* \* \* \* \*